US006767104B2

(12) United States Patent
Worrell

(10) Patent No.: US 6,767,104 B2
(45) Date of Patent: Jul. 27, 2004

(54) BACKLIGHTABLE KNOB, WHICH HAS INDICATOR BONDED INTIMATELY TO LIGHT PIPE, AND METHOD OF MAKING SAME

(75) Inventor: James L. Worrell, DeKalb, IL (US)

(73) Assignee: K I Industries, Inc., Berkeley, IL (US)

( * ) Notice: Subject to any disclaimer, the term of this patent is extended or adjusted under 35 U.S.C. 154(b) by 67 days.

(21) Appl. No.: 10/184,753

(22) Filed: Jun. 28, 2002

(65) Prior Publication Data

US 2004/0001329 A1 Jan. 1, 2004

(51) Int. Cl.$^7$ ................................................ G01D 11/28
(52) U.S. Cl. ........................................... 362/26; 362/30
(58) Field of Search ........................... 362/26, 30, 551, 362/511, 489; 16/121, 441, 443; 74/553

(56) References Cited

U.S. PATENT DOCUMENTS

| | | | | | |
|---|---|---|---|---|---|
| 5,050,269 | A | | 9/1991 | Engstrom et al. | |
| 5,359,165 | A | | 10/1994 | Leveque et al. | |
| 5,450,653 | A | | 9/1995 | Howie, Jr. | |
| 5,688,461 | A | | 11/1997 | Howie, Jr. | |
| 5,752,759 | A | | 5/1998 | Pizzo | |
| 5,845,365 | A | | 12/1998 | Howie, Jr. | |
| 5,983,827 | A | * | 11/1999 | Cookingham et al. | 116/288 |
| 6,003,206 | A | | 12/1999 | Hall et al. | |
| 6,019,478 | A | | 2/2000 | Pizzo | |
| 6,302,551 | B1 | * | 10/2001 | Matumoto | 362/27 |
| 6,338,561 | B1 | * | 1/2002 | Ikarashi | 362/26 |
| 6,499,191 | B1 | * | 12/2002 | Howie, Jr. | 16/441 |

* cited by examiner

*Primary Examiner*—Y. My Quach-Lee
*Assistant Examiner*—Peggy A. Neils
(74) *Attorney, Agent, or Firm*—Wood, Phillips, Katz, Clark & Mortimer

(57) ABSTRACT

In a backlighted knob, as for automotive use, an indicator and a light pipe are molded simultaneously so as to be intimately bonded to each other, in a translucent structure. A polymeric body, which comprises a front wall and a central hub, is molded around the translucent structure as to cause the front wall and the translucent structure to be intimately bonded to each other. An outer cover is molded so as to cover an outer face of the front wall, except that the indicator is exposed through an aperture in the front wall and through an aperture in the outer cover. The indicator and the light pipe are translucent. The polymeric body and the outer cover are opaque. The indicator exhibits a light color, such as white, in ambient light. The light pipe is tinted so as to cause the indicator to exhibit a color contrasting with the light color when the light pipe is backlighted.

22 Claims, 3 Drawing Sheets

BACKLIGHTABLE KNOB, WHICH HAS INDICATOR BONDED INTIMATELY TO LIGHT PIPE, AND METHOD OF MAKING SAME

TECHNICAL FIELD OF THE INVENTION

This invention pertains to a backlightable knob, as for automotive use, of a type wherein an indicator exhibits one color, such as white, in ambient light and wherein the indicator indicates a contrasting color when backlighted via a light pipe. This invention contemplates that the indicator and the light pipe are molded simultaneously so as to be intimately bonded to each other.

BACKGROUND OF THE INVENTION

As exemplified in U.S. Pat. No. 5,359,165, it is known for such a knob to employ a light pipe, an outer end of which is flush with an outer wall. This patent discloses a method of making the knob wherein the light pipe is positioned as an insert in a mold wherein opaque material is molded over the light pipe.

As exemplified in U.S. Pat. Nos. 5,752,759, 6,003,206, and 6,019,478, in which the indicator is called a jewel and in which the light pipe is called a jewel holder, and as exemplified in U.S. Pat. No. 5,845,365, it is known for an indicator to exhibit one color, such as white, in ambient light, and to exhibit a contrasting color when backlighted via a light pipe.

U.S. Pat. No. 5,050,269, U.S. Pat. No. 5,450,653, and U.S. Pat. No. 5,688,461 provide further background of this invention.

SUMMARY OF THE INVENTION

This invention provides an improvement in a backlightable knob of the type noted above. Moreover, this invention provides a method for making such a knob, as improved.

The backlightable knob comprises a translucent structure, which comprises an indicator and a light pipe. The indicator is molded from a polymeric material, which is translucent and which exhibits a light color in ambient light, the light pipe is molded from a polymeric material, which is translucent and which is tinted so as to cause the indicator to exhibit a color contrasting with the light color when the light pipe is backlighted. This invention contemplates that the indicator and the light pipe are molded simultaneously so as to be intimately bonded to each another.

Preferably, the backlightable knob further comprises a polymeric body, which comprises a front wall and a central hub, wherein the front wall and the central hub are molded simultaneously. Preferably, moreover, the front wall has an outer face and has an aperture, through which the translucent structure extends so as to expose the indicator at the outer face.

In a preferred embodiment, the front wall and the central hub are molded simultaneously and unitarily. In the preferred embodiment, moreover, the front wall is molded around the translucent structure so as to cause the front wall and the translucent structure to be intimately bonded to each other.

In the preferred embodiment, furthermore, the backlightable knob further comprises an outer cover, which has an outer face and which is molded from a polymeric material so as to cover the outer face of the front wall of the polymeric body, except that the outer cover has an aperture, through which the indicator remains exposed.

DETAILED DESCRIPTION OF THE ILLUSTRATED EMBODIMENT

Figure 1:
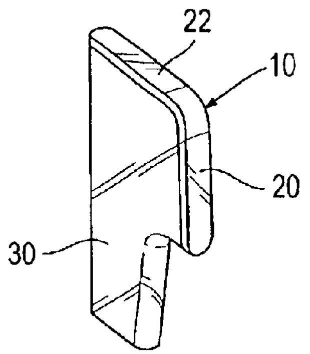
FIG. 1 is an isometric view of a translucent structure, which comprises an indicator and a light pipe, as molded simultaneously so as to be intimately bonded to each other, in a manner contemplated by this invention.
Figure 5:
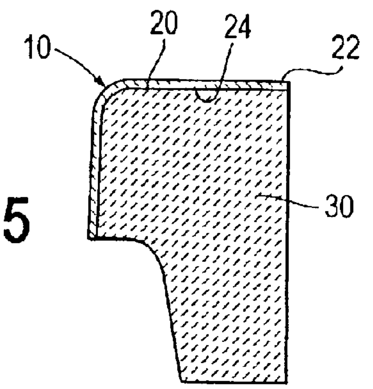
FIGS. 5, 6, and 7 are cross-sectional views, as taken through what is illustrated in FIGS. 1, 2, and 3 respectively.

As illustrated in FIG. 1, FIG. 5, and other views, a backlightable knob improved by this invention comprises a translucent structure 10, in which an indicator 20, which has an outer face 22 and an inner face 24, and a light pipe 30 are molded simultaneously so as to be intimately bonded to each other at the inner face 24 of the indicator 20.

The indicator 20 is molded from a polymeric material, such as polycarbonate, which is translucent and which exhibits a light color, such as white, in ambient light. The light pipe 30 is molded from a polymeric material, such as polycarbonate, which is translucent and which is tinted so as to cause the indicator 20 to exhibit a color contrasting with the light color, such as red, blue, or green, when the light pipe 30 is backlighted. The polymeric material for the indicator 20 and the polymeric material for the light pipe 30 are selected for their capability to be intimately bonded to each other. Preferably, except for their respective colorations, the polymeric material for the indicator 20 and the polymeric material for the light pipe 30 are similar materials.

Figure 2:
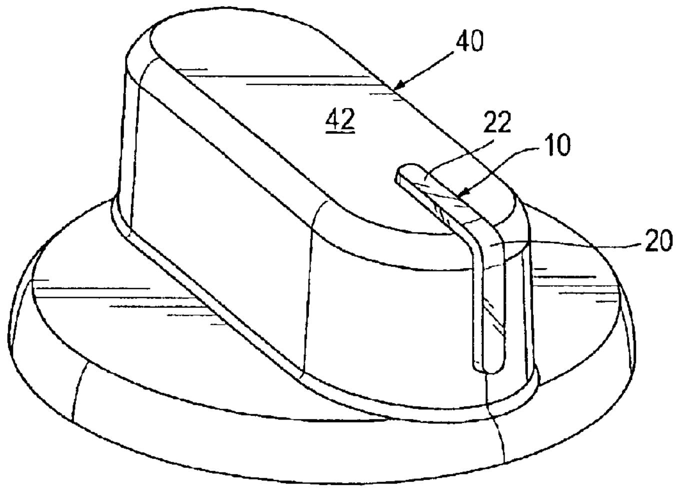
FIG. 2 is an isometric view of a polymeric body, as molded around the translucent structure so as to expose the indicator through an aperture in the polymeric body, as contemplated by this invention.
Figure 6:
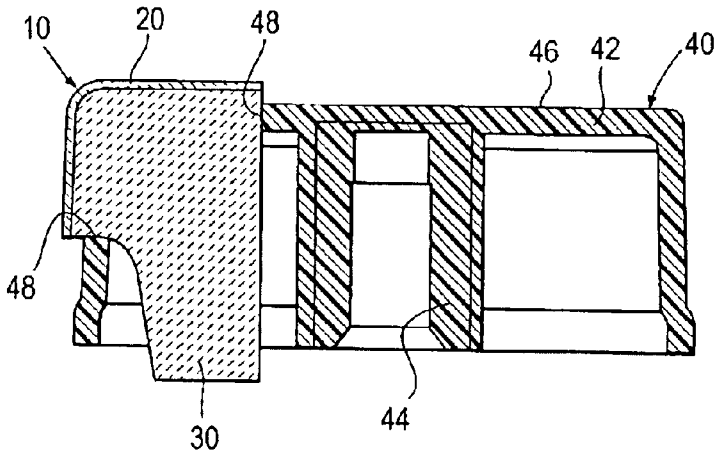

As illustrated in FIG. 2, FIG. 6, and other views, the backlightable knob improved by this invention further comprises a polymeric body 40, which comprises a front wall 42 and a central hub 44. The front wall 42 and the central hub 44 are molded simultaneously and unitarily from a polymeric material, such as polycarbonate, which is opaque, preferably of a dark color, such as black. The front wall 42 has an outer face 46. Further, the front wall 42 has an aperture 48, through which the translucent structure 10 extends so as to expose the indicator 20 at the outer face 46 of the front wall 42.

Figure 3:
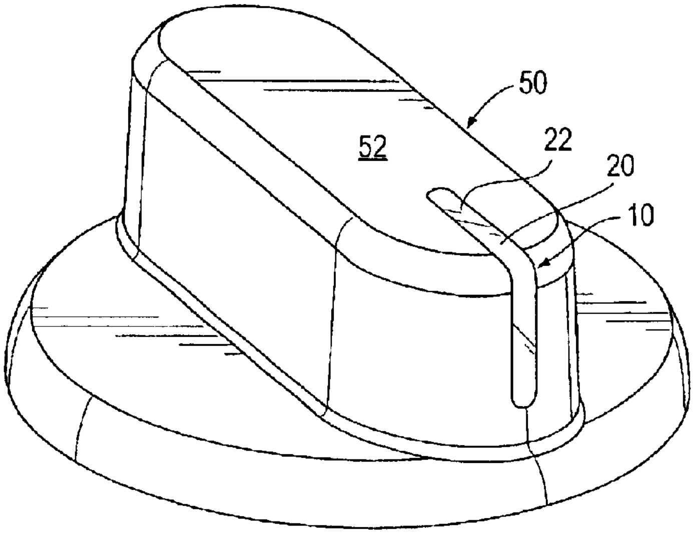
FIG. 3 is an isometric view of a backlightable knob comprising an outer cover, as molded so as to cover an outer face of the front wall of the polymeric body, except that the outer cover has an aperture, through which the indicator remains exposed, as contemplated by this invention.
Figure 4:
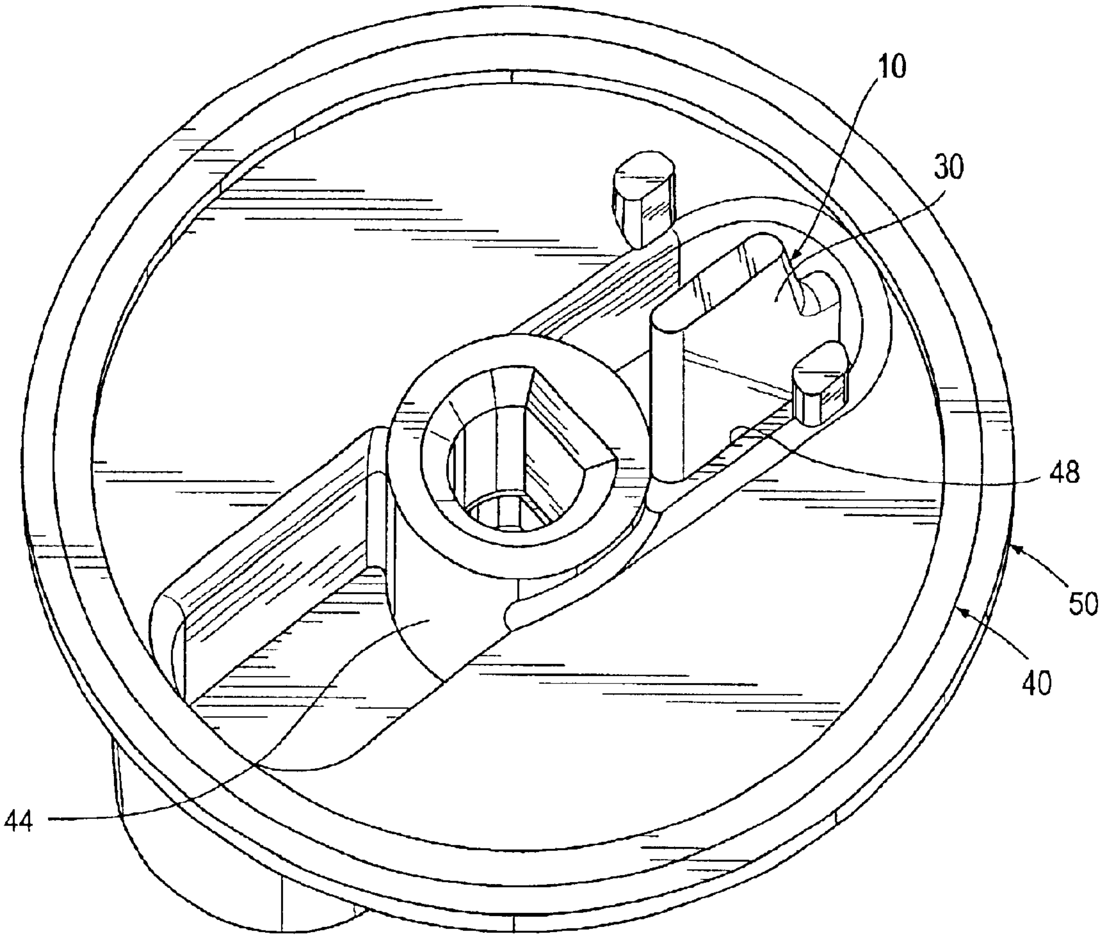
FIG. 4, on a larger scale, is an isometric view of the backlightable knob, as seen from its underside.
Figure 7:
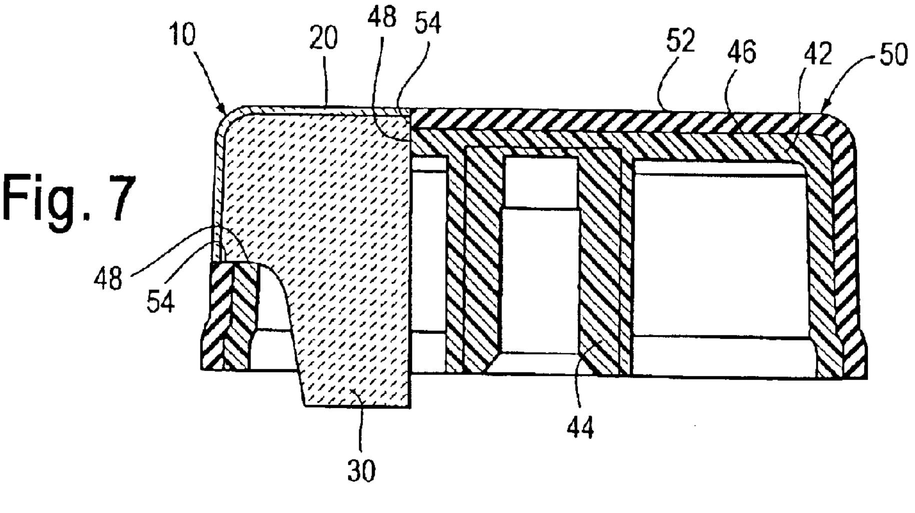

As illustrated in FIG. 3, FIG. 7, and other views, the backlightable knob improved by this invention further comprises an outer cover 50, which has an outer face 52 and which is molded from a polymeric material so as to cover the outer face 46 of the front wall 42 of the polymeric body 40, except that the outer cover 50 has an aperture 54, through which the indicator 20 remains exposed. As illustrated, the outer face 22 of the indicator 20 is flush with the outer face 52 of the outer cover 50. Alternatively, the outer face 22 of the indicator 20 may be slightly debossed or may be slightly embossed.

Preferably, the polymeric materials for the indicator 20, for the light pipe 30, and for the polymeric body 40 are comparatively harder materials, whereas the polymeric material for the outer cover 50 is a comparatively softer material, such as a synthetic rubber.

What is claimed is:

1. In a backlightable knob comprising a translucent structure, which comprises an indicator and a light pipe, the indicator being molded from a polymeric material, which is translucent and which exhibits a light color in ambient light, the light pipe being molded from a polymeric material, which is translucent and which is tinted so as to cause the indicator to exhibit a color contrasting with the light color when the light pipe is backlighted, an improvement wherein the indicator and the light pipe are molded simultaneously so as to be intimately bonded to each another.

2. The improvement of claim 1 further comprising a polymeric body, which comprises a front wall and a central hub, wherein the front wall and the central hub are molded simultaneously, wherein the front wall has an outer face, and wherein the front wall has an aperture, through which the translucent structure extends so as to expose the indicator at the outer face of the front wall.

3. The improvement of claim 1 further comprising a polymeric body, which comprises a front wall and a central hub, wherein the front wall and the central hub are molded simultaneously and unitarily, wherein the front wall has an outer face, and wherein the front wall has an aperture slot, through which the translucent structure extends so as to expose the indicator at the outer face of the front wall.

4. The improvement of claim 1 further comprising a polymeric body, which comprises a front wall and a central hub, wherein the front wall and the central hub are molded simultaneously and unitarily from a polymeric material, which is opaque, wherein the front wall has an outer face, and wherein the front wall has an aperture, through which the translucent structure extends so as to expose the indicator at the outer face of the front wall.

5. The improvement of claim 2 wherein the front wall is molded around the translucent structure so as to cause the front wall and the translucent structure to be intimately bonded to each other.

6. The improvement of claim 5 further comprising an outer cover, which has an outer face and which is molded from a polymeric material so as to cover the outer face of the front wall of the polymeric body, except that the outer cover has an aperture, through which the indicator remains exposed.

7. The improvement of claim 6 wherein the indicator has an outer face, which is flush with the outer face of the outer cover.

8. The improvement of claim 3 wherein the front wall is molded around the translucent structure so as to cause the front wall and the translucent structure to be intimately bonded to each other.

9. The improvement of claim 8 further comprising an outer cover, which has an outer face and which is molded from a polymeric material so as to cover the outer face of the front wall of the polymeric body, except that the outer cover has an aperture, through which the indicator remains exposed.

10. The improvement of claim 9 wherein the indicator has an outer face, which is flush with the outer face of the outer cover.

11. The improvement of claim 4 wherein the front wall is molded around the translucent structure so as to cause the front wall and the translucent structure to be intimately bonded to each other.

12. The improvement of claim 11 further comprising an outer cover, which has an outer face and which is molded from a polymeric material so as to cover the outer face of the front wall of the polymeric body, except that the outer cover has an aperture, through which the indicator remains exposed.

13. The improvement of claim 12 wherein the indicator has an outer face, which is flush with the outer face of the outer cover.

14. A method for making a backlightable knob comprising a translucent structure, which comprises an indicator and a light pipe, wherein the method comprises molding the indicator from a polymeric material, which is translucent and which exhibits a light color in ambient light, and molding the light pipe from a polymeric material, which is translucent and which is tinted so as to cause the indicator to exhibit a color contrasting with the light color when the light pipe is backlighted, wherein the indicator and the light pipe are molded simultaneously so as to be intimately bonded to each another.

15. The method of claim 14 wherein the method further comprises molding a polymeric body, which comprises a front wall and a central hub, and wherein the front wall and the central hub are molded simultaneously, whereby the front wall has an outer face, and whereby the front wall has an aperture slot, through which to expose the indicator at the outer face of the front wall.

16. The method of claim 14 wherein the method further comprises molding a polymeric body, which comprises a front wall and a central hub, and wherein the front wall and the central hub are molded simultaneously and unitarily, whereby the front wall has an outer face, and whereby the front wall has an aperture slot, through which to expose the indicator at the outer face of the front wall.

17. The method of claim 15 wherein the front wall is molded around the translucent structure so as to cause the front wall and the translucent structure to be intimately bonded to each other and so as to expose the indicator at the aperture of the front wall.

18. The method of claim 17 wherein the method further comprises molding an outer cover, which has an outer face, from a polymeric material so as to cover the outer face of the front wall of the polymeric body, except that the outer cover has an aperture, through which the indicator remains exposed.

19. The method of claim 18 wherein the indicator has an outer face, which is flush with the outer face of the outer cover.

20. The method of claim 16 wherein the front wall is molded around the translucent structure so as to cause the front wall and the translucent structure to be intimately bonded to each other and so as to expose the indicator at the aperture of the front wall.

21. The method of claim 20 wherein the method further comprises molding an outer cover, which has an outer face, from a polymeric material so as to cover the outer face of the front wall of the polymeric body, except that the outer cover has an aperture, through which the indicator remains exposed.

22. The method of claim 21 wherein the indicator has an outer face, which is flush with the outer face of the outer cover.

* * * * *